US008559371B2

(12) United States Patent
Wu et al.

(10) Patent No.: US 8,559,371 B2
(45) Date of Patent: Oct. 15, 2013

(54) BASE STATION DEVICE AND DATA MAPPING METHOD

(75) Inventors: Jianming Wu, Kawasaki (JP); Tomohiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 529 days.

(21) Appl. No.: 12/950,280

(22) Filed: Nov. 19, 2010

(65) Prior Publication Data

US 2011/0064030 A1  Mar. 17, 2011

Related U.S. Application Data

(63) Continuation of application No. PCT/JP2008/062103, filed on Jul. 3, 2008.

(51) Int. Cl.
*H04W 4/00* (2009.01)

(52) U.S. Cl.
USPC .......................................... 370/328

(58) Field of Classification Search
None
See application file for complete search history.

(56) References Cited

U.S. PATENT DOCUMENTS

| 6,167,031 | A | 12/2000 | Olofsson et al. | |
|---|---|---|---|---|
| 2002/0147953 | A1 | 10/2002 | Catreux et al. | |
| 2005/0272456 | A1* | 12/2005 | Yoshii et al. | 455/522 |
| 2006/0234729 | A1 | 10/2006 | Murakami et al. | |
| 2008/0084844 | A1* | 4/2008 | Reznik et al. | 370/330 |
| 2008/0305823 | A1* | 12/2008 | Matsumoto et al. | 455/522 |

FOREIGN PATENT DOCUMENTS

| JP | 2000068959 A | * | 3/2000 |
|---|---|---|---|
| JP | 2001-515307 | | 9/2001 |
| JP | 2005-39807 | | 2/2005 |
| JP | 2005-521358 | | 7/2005 |
| JP | 2005-252834 | | 9/2005 |
| WO | 03/085876 | | 10/2003 |

OTHER PUBLICATIONS

Dong In Kim. "Two-Best User Scheduling for High-Speed Downlink Multicode CDMA with Code Constraint" IEEE Communications Society, 2004.
Siavash M. Alamouti. "A Simple Transmit Diversity Technique for Wireless Communications" IEEE Journal on Select Areas in Communications, vol. 16, No. 8, Oct. 1998.
Bon-Jin Ku, et al. "Iterative Decoding of Serially Concatenated Space-Time Codes in WCDMA Systems" IEEE, 2002.
Ch. Wengerter, A. "Advanced Hybrid ARQ Technique Employing a Signal Constellation Rearrangement" IEEE, 2002.
Aik Chindapol. "Bit-Interleaved Coded Modulation with Signal Space Diversity in Rayleigh Fading" IEEE, 1999.
Notice of Rejection dated Apr. 17, 2012, from corresponding Japanese Application No. 2010-518860.

(Continued)

*Primary Examiner* — Kibrom T Hailu
(74) *Attorney, Agent, or Firm* — Katten Muchin Rosenman LLP

(57) ABSTRACT

A base station device includes a determining unit that determines a combination of a plurality of users having different reception qualities, an allocating unit that generates a plurality of hierarchical modulation channels having different qualities based on channel elements constituting channels corresponding to the respective users in the combination determined by the determining unit, and allocates the hierarchical modulation channels to the respective users such that a hierarchical modulation channel having a higher quality is allocated to a user having a lower reception quality, a mapping unit that maps data for each user to the hierarchical modulation channel allocated to each user by the allocating unit, and a transmitting unit that transmits the data mapped by the mapping unit.

11 Claims, 9 Drawing Sheets

(56) References Cited

OTHER PUBLICATIONS

International Search Report dated Oct. 7, 2008, from the corresponding International Application.

Md. Jahangir Hossain, et al. "Multi-User Opportunistic Scheduling using Power Controlled Hierarchical Constellations" IEEE Transactions on Wireless Communications, vol. 6, No. 5, May 2007.

Md. Jahangir Hossain, et al. "Rate Adaptive Hierarchical Modulation-Assisted Two-User Opportunistic Scheduling" IEEE Transactions on Wireless Communications, vol. 6, No. 6, Jun. 2007.

Masakazu Morimoto, et al. "A Study on Power Assignment of Hierarchical Modulation Schemes for Digital Broadcasting" ITEJ Technical Report, vol. 18, No. 21, pp. 31-35, Mar. 1994.

3GPP TSG-RAN WG1 #42bis, "Description, Simulations and TP on Hierarchical Modulation Technique for E-UTRA MBMS Evaluation" QUALCOMM Europe, Oct. 14, 2005.

Masakazu Morimoto, et al."A Hierarchical Image Transmission System in a Fading Channel" IEEE, 1995.

Slawomir Pietrzyk, et al. "Subcarrier and Power Allocation for QoS-aware OFDMA Systems Using Embedded Modulation" IEEE Communications Society, 2004.

Pavan K. Vitthaladevuni, et al. "A Recursive Algorithm for the Exact BER Computation of Generalized Hierarchical QAM Constellations", IEEE Transactions on Information Theory, Vol. 49, no. 1, Jan. 2003.

Kannan Ramchandran, et al. "Multiresolution Broadcast for Digital HDTV Using Joint Source/Channel Coding" IEEE Journal on Selected Areas in Communications, vol. 11, No. 1, Jan. 1993.

Michael B. Pursley, et al. "Adaptive Nonuniform Phase-Shift-Key Modulation for Multimedia Traffic in Wireless Networks" IEEE Journal on Selected Areas in Communications, vol. 18, No. 8, Aug. 2000.

\* cited by examiner

FIG.9

QPSK

| NUMBER | BAD UE (UE #0) | GOOD UE (UE #1) |
|---|---|---|
| 1 | $I_0+Q_0$ | $I_1+Q_1$ |
| 2 | $I_0+Q_1$ | $I_1+Q_0$ |
| 3 | $I_0+I_1$ | $Q_0+Q_1$ |

16QAM

| NUMBER | BAD UE (UE #0) | GOOD UE (UE #1) |
|---|---|---|
| 1 | MSB0+LSB0 | MSB1+LSB1 |
| 2 | MSB0+MSB1 | LSB0+LSB1 |
| 3 | MSB0+LSB1 | LSB0+MSB1 |
| 4 | MSB0+MSB1+LSB0 | LSB1 |
| 5 | MSB0+LSB0+LSB1 | MSB1 |

64QAM

| NUMBER | BAD UE (UE #0) | GOOD UE (UE #1) |
|---|---|---|
| 1 | MSB0+SB0+LSB0 | MSB1+SB1+LSB1 |
| 2 | MSB0+MSB1 | SB0+LSB0+SB1+LSB1 |
| 3 | MSB0+MSB1+SB0 | SB1+LSB0+LSB1 |
| 4 | MSB0+MSB1+LSB1 | SB0+LSB0+SB1 |
| 5 | MSB0+SB1+LSB1 | MSB1+SB0+LSB0 |
| 6 | MSB0+SB0+MSB1+SB1 | LSB0+LSB1 |
| 7 | MSB0+LSB0+MSB1+LSB1 | SB0+SB1 |

16QAM+64QAM

| NUMBER | BAD UE (UE #0) | GOOD UE (UE #1) |
|---|---|---|
| 1 | MSB0+LSB0 | MSB1+SB1+LSB1 |
| 2 | MSB0+LSB0+MSB1 | SB1+LSB1 |
| 3 | MSB0+MSB1+SB1 | LSB0+LSB1 |
| 4 | MSB0+MSB1+LSB1 | LSB0+SB1 |
| 5 | MSB0+LSB0+SB1 | MSB1+LSB1 |
| 6 | MSB0+LSB0+LSB1 | MSB1+SB1 |
| 7 | MSB0+SB1+LSB1 | LSB0+MSB1 |

FIG.10
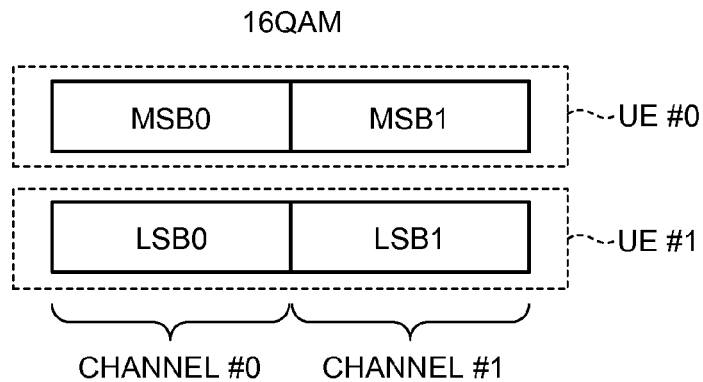
16QAM
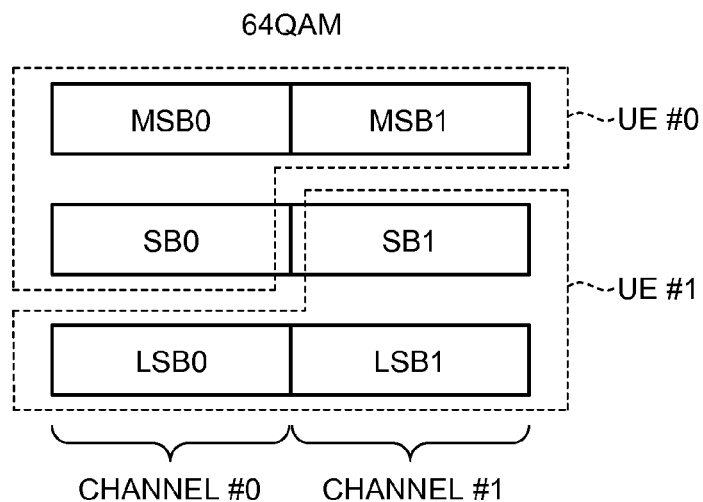
64QAM
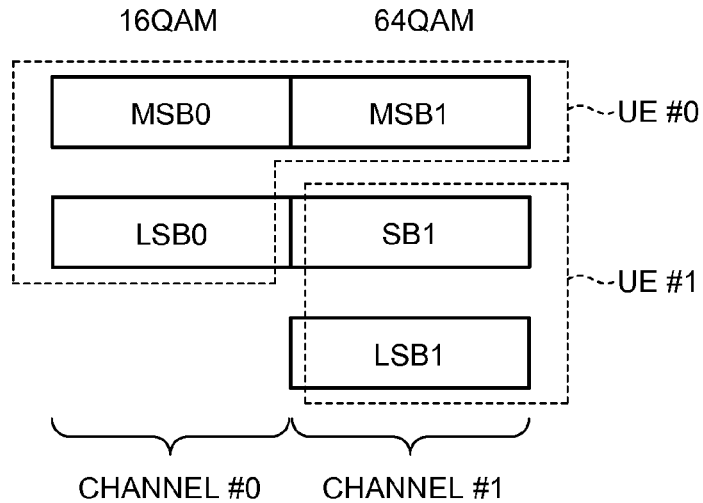
16QAM    64QAM

BASE STATION DEVICE AND DATA MAPPING METHOD

CROSS-REFERENCE TO RELATED APPLICATION

This application is a continuation of International Application No. PCT/JP2008/062103, filed on Jul. 3, 2008, the entire contents of which are incorporated herein by reference.

FIELD

The embodiment discussed herein is directed to a base station device and a data mapping method.

BACKGROUND

Conventionally, in wireless communication systems, a technology such as Space Multiplexing Multi-Input and Multi-Output (hereinafter, abbreviated as "SM-MIMO") that allows to simultaneously transmit mutually different data from a plurality of transmission antennas has been studied as a transmission method for improving transmission efficiency. In SM-MIMO, because mutually different data are simultaneously transmitted from multiple antennas, when the reception quality of a receiving apparatus is good, the data transmission efficiency can be improved. However, when the reception quality is bad, data re-transmission is frequently performed, so that the transmission efficiency may be reduced. One measure against this is to combine transmission diversity (e.g., STC (Space-Time Coding) that allows to simultaneously transmit mutually identical data from a plurality of transmission antennas with SM-MIMO, and to transmit data by switching between transmission methods for the transmission diversity and for SM-MIMO depending on the reception quality (see, for example, Japanese Laid-open Patent Publication No. 2005-39807).

In this case, to reduce a processing load for switching the transmission methods, it has been studied that a modulation scheme and a code rate are also changed depending on the reception quality of the receiving apparatus during the data transmission in the same manner as normal AMC (Adaptive Modulation and Coding). In AMC, a transmitting apparatus receives a report on the reception quality from the receiving apparatus, and adaptively changes the code rate and the modulation scheme (MCS: Modulation and Coding Scheme) for transmission data depending on the reception quality. That is, the transmitting apparatus increases the code rate and a modulation level (e.g., 64QAM) for data to be transmitted to a receiving apparatus having good reception quality, and decreases the code rate and the modulation level (e.g., QPSK) for data to be transmitted to a receiving apparatus having bad reception quality.

A hierarchical modulation scheme has also been known as the transmission method for improving the transmission efficiency. The hierarchical modulation scheme is frequently used in the field of digital broadcasting or the like, and in which a plurality of bits transmitted by one symbol is hierarchized and different data is mapped to each level. For example, important data is mapped to a bit in a high level for which an error is less likely to occur, and less important data is mapped to a bit in a low level for which an error is more likely to occur. Consequently, frame data or the like indispensable to video reproduction can infallibly be transmitted without issuance of a retransmission request therefor, so that the transmission efficiency can be improved.

However, when the above-mentioned transmission method is implemented, there is a problem in that the transmission efficiency is not improved to more than a predetermined level especially in a wireless communication system in which data is transmitted to a plurality of user terminal devices. That is, in the wireless communication system, as illustrated in FIG. 1 for example, user data #0 and user data #1 to be transmitted to different user terminal devices are mapped to a channel #0 and a channel #1 corresponding to the user terminal devices, respectively. Furthermore, in the wireless communication system employing MCS for example, when the state of the channel #0 is degraded, the reception quality of the user data #0 is degraded, so that the code rate and the modulation scheme for the channel #0 are changed. However, because practically changeable code rate and modulation scheme are limited, it is not always possible to select optimal MCS for the state of the channel #0.

Furthermore, when the reception quality of the user data #1 is good, a code rate and a modulation scheme that are excessive for the actual reception quality may be selected when selecting MCS in a practical range, so that resources may be wasted. As described above, the user data #0 and #1 are respectively mapped to the channels #0 and #1 that are independent of each other, so that when there is a large difference in the reception quality between the respective user terminal devices corresponding to the channels #0 and #1, there may be a case in which resources are wasted in one channel while resources run short in the other channel.

SUMMARY

According to an aspect of an embodiment of the invention, a base station device includes a determining unit that determines a combination of a plurality of users having different reception qualities, an allocating unit that generates a plurality of hierarchical modulation channels having different qualities based on channel elements constituting channels corresponding to the respective users in the combination determined by the determining unit, and allocates the hierarchical modulation channels to the respective users such that a hierarchical modulation channel having a higher quality is allocated to a user having a lower reception quality, a mapping unit that maps data for each user to the hierarchical modulation channel allocated to each user by the allocating unit, and a transmitting unit that transmits the data mapped by the mapping unit.

According to another aspect of an embodiment of the invention, a user terminal device includes a control channel receiving unit that receives a control channel signal indicating an allocated hierarchical modulation channel generated based on channel elements of channels corresponding to own user and other users, a receiving unit that receives signals of all channels corresponding to the hierarchical modulation channel allocated to the own user based on the control channel signal received by the control channel receiving unit, and an extracting unit that extracts data addressed to the own user from the signals received by the receiving unit.

According to still another aspect of an embodiment of the invention, a data mapping method includes determining a combination of a plurality of users having different reception qualities, generating a plurality of hierarchical modulation channels having different qualities based on channel elements constituting channels corresponding to the respective users in the combination determined at the determining, allocating the hierarchical modulation channels to the respective users such that a hierarchical modulation channel having a higher quality is allocated to a user having a lower reception quality, and mapping data for each user to the hierarchical modulation channel allocated to each user at the allocating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a diagram illustrating a detailed example of a hierarchical modulation channel according to the embodiment;

FIG. 10 is a diagram illustrating a detailed example of data mapping according to the embodiment;

DESCRIPTION OF EMBODIMENT

Preferred embodiments of the present invention will be explained with reference to accompanying drawings.

The gist of the present invention is that a plurality of user terminal devices is combined, a plurality of channels corresponding to the combined user terminal devices is hierarchized as a whole, and user data is mapped to each level of hierarchy depending on the reception quality of each of the combined user terminal devices. An embodiment of the present invention will be described in detail below with reference to the drawings. In the following, an example is described in which either a normal MCS, by which a code rate and a modulation scheme are selected per channel of each user terminal device, or a hierarchical MCS, by which a level of hierarchy obtained by hierarchizing the whole channels of a plurality of user terminal devices is allocated to each user terminal device, is applied depending on a throughput. However, it is possible to omit comparison of the throughputs and always apply the hierarchical MCS.

Figure 1:
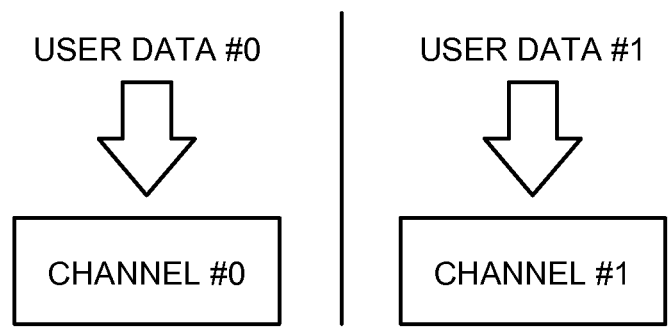
FIG. 1 is a diagram schematically illustrating an example of data mapping.
Figure 2:
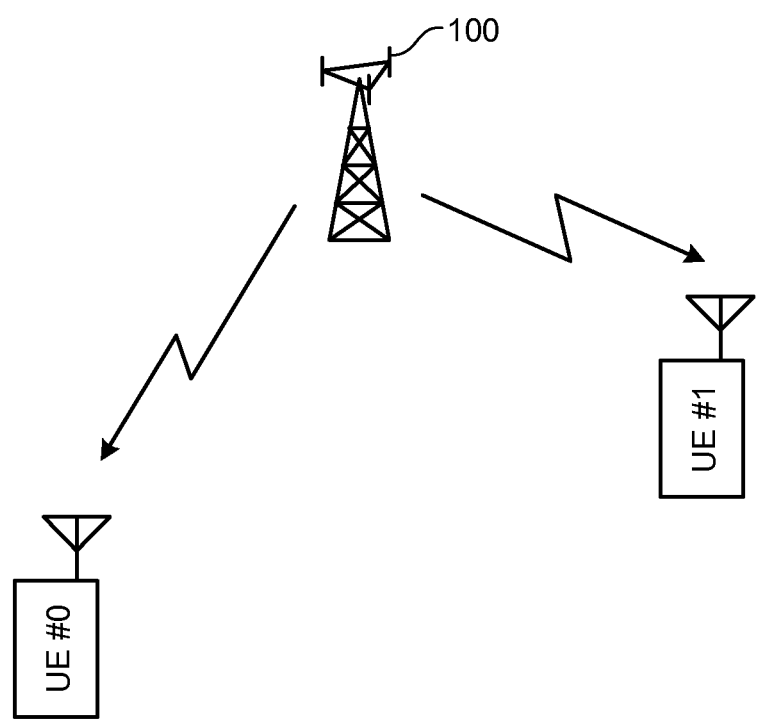
FIG. 2 is a diagram illustrating an overview of a wireless communication system according to an embodiment.

FIG. 2 is a diagram illustrating the overview of a wireless communication system according to the embodiment. As illustrated in the figure, according to the embodiment, a base station device 100 performs a wireless communication with N user terminal devices (N is an integer equal to or greater than 2) including a UE (User Equipment) #0 and a UE #1. It is assumed that the UE #0 is located farther from the base station device 100 than the UE #1, and the state of a line between the base station device 100 and the UE #0 is worse than the state of a line between the base station device 100 and the UE #1. That is, it is assumed that the reception state of the UE #0 is bad while the reception state of the UE #1 is good, which means that the reception quality is different between the two user terminal devices.

Each of the UE #0 and the UE #1 receives a signal transmitted from the base station device 100, and reports the reception quality such as SNR (Signal to Noise Ratio) to the base station device 100.

The base station device 100 receives reports on the SNR from all of the user terminal devices including the UE #0 and the UE #1 performing the wireless communication therewith, and makes pairs of two user terminal devices of which SNRs differ from each other. Then, the base station device 100 maps user data for each of the two user terminal devices as a pair to a bit in a different level of hierarchy depending on the SNR of each user terminal device. At this time, the base station device 100 maps user data of the user terminal device having bad reception quality to a bit in a high level of the hierarchy and maps user data of the user terminal device having good reception quality to a bit in a low level of the hierarchy between the whole two channels corresponding to the user terminal devices as a pair. That is, when, for example, the UE #0 and the UE #1 are paired, the base station device 100 maps user data for the UE #0 to a bit in a high level in the hierarchy and maps user data for the UE #1 to a bit in a low level in the hierarchy in the two channels corresponding to these user terminal devices.

Figure 3:
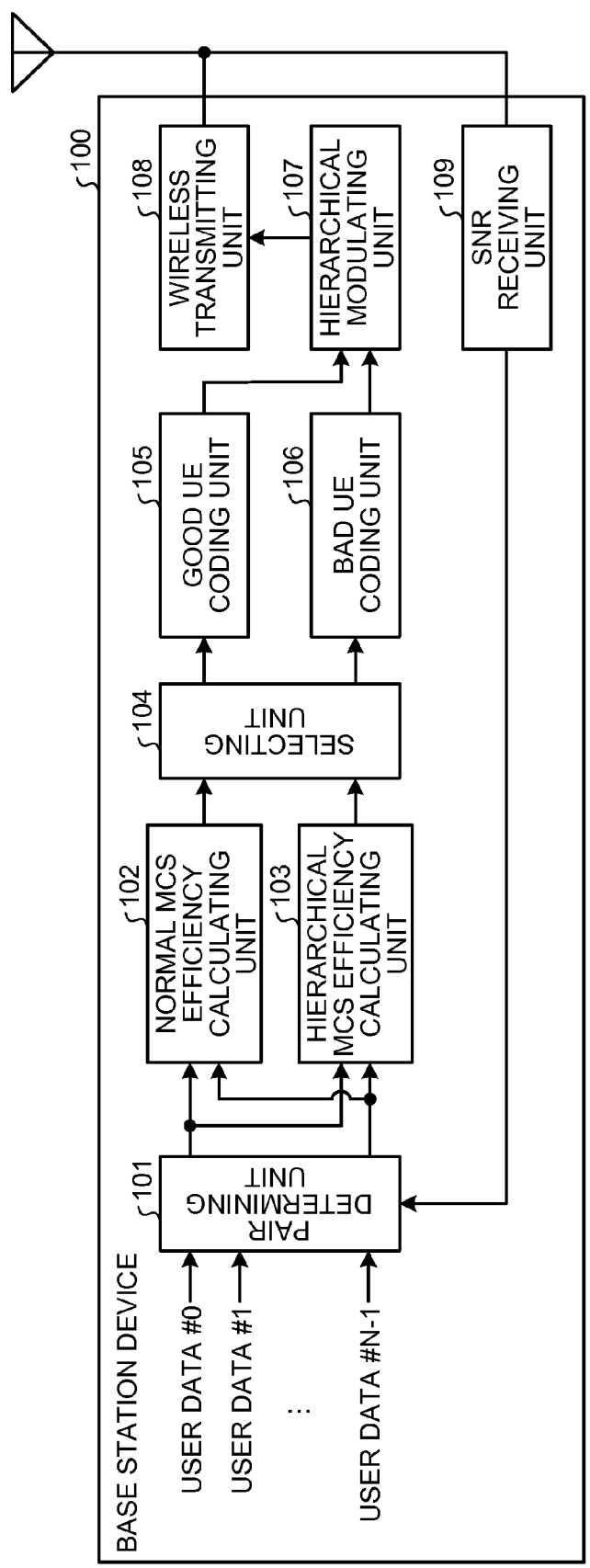
FIG. 3 is a block diagram illustrating configuration of main components of a base station device according to the embodiment.

FIG. 3 is a block diagram illustrating the configurations of main components of the base station device 100 according to the embodiment. The base station device 100 illustrated in FIG. 3 includes a pair determining unit 101, a normal MCS efficiency calculating unit 102, a hierarchical MCS efficiency calculating unit 103, a selecting unit 104, a good UE coding unit 105, a bad UE coding unit 106, a hierarchical modulating unit 107, a wireless transmitting unit 108, and an SNR receiving unit 109.

The pair determining unit 101 performs scheduling based on the SNR that the SNR receiving unit 109 has received from each of the N user terminal devices, and determines an order of transmission of user data to each user terminal device. More specifically, the pair determining unit 101 determines pairs by combining two user terminal devices of which SNRs greatly differ from each other. For example, the pair determining unit 101 determines to make a pair of the UE #0 and the UE #1 of which reception qualities differ from each other by a predetermined value or more. Here, it is assumed that the reception quality of the UE #0 is lower than the reception quality of the UE #1. After determining the pairs for all of the N user terminal devices, the pair determining unit 101 determines the order of transmission of user data for each pair. Thereafter, the pair determining unit 101 outputs the user data of each pair to the normal MCS efficiency calculating unit 102 and the hierarchical MCS efficiency calculating unit 103 together with the SNR of each user terminal device in the order of transmission.

Figure 4:
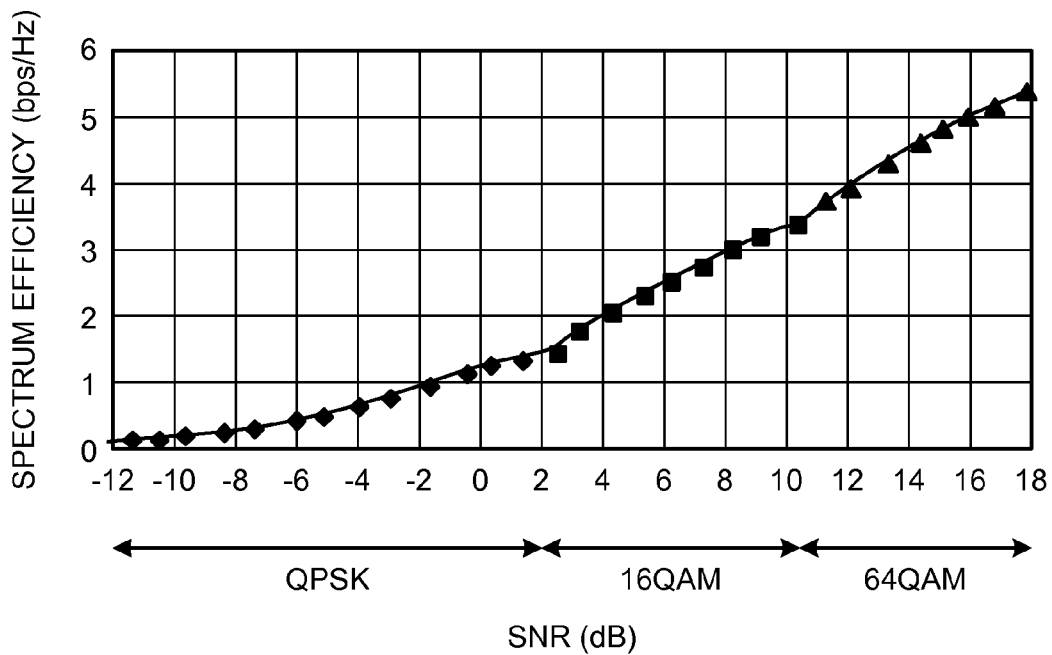
FIG. 4 is a diagram illustrating a detailed example of spectrum efficiency in a normal MCS.

The normal MCS efficiency calculating unit 102 calculates the spectrum efficiency obtained when MCS is individually applied to the user terminal devices of each pair. That is, the normal MCS efficiency calculating unit 102 calculates the spectrum efficiency obtained when an optimal modulation scheme is selected depending on the SNR of each user terminal device. Then, the normal MCS efficiency calculating unit 102 calculates a throughput obtained when the normal MCS is applied to each pair, based on the calculated spectrum efficiency. An exemplary relationship between the SNR and the spectrum efficiency when the normal MCS is applied is illustrated in FIG. 4. That is, when the SNR is relatively small, the spectrum efficiency of QPSK using a small modulation level becomes the highest, and the spectrum efficiency of the modulation scheme using the increased modulation level becomes the highest as the SNR increases. In other words, QPSK for example is the optimal modulation scheme for a user terminal device having low SNR, and 64QAM for example is the optimal modulation scheme for a user terminal device having high SNR.

Figure 5:
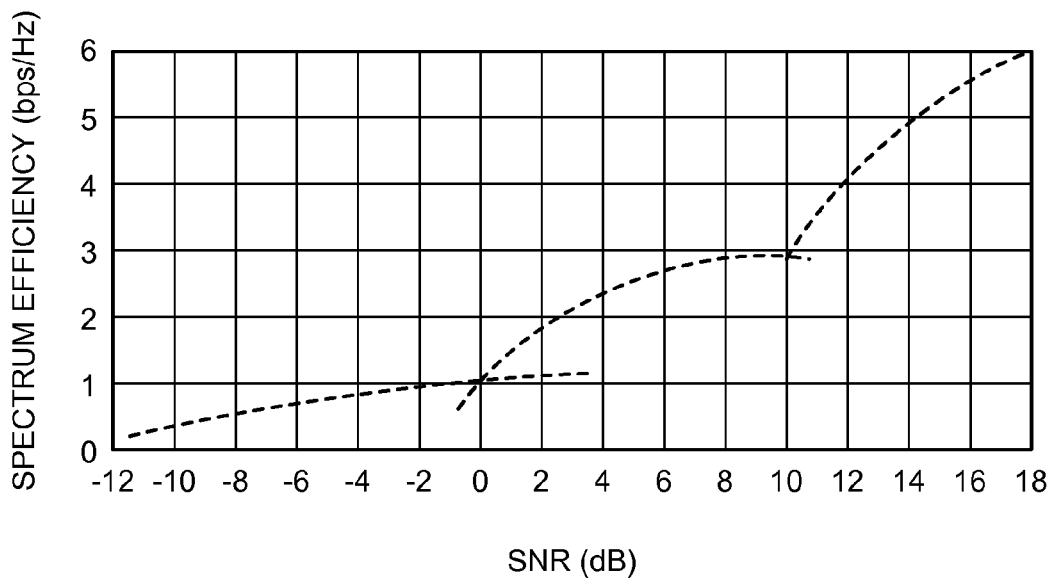
FIG. 5 is a diagram illustrating a detailed example of spectrum efficiency in a hierarchical MCS.

The hierarchical MCS efficiency calculating unit 103 collectively hierarchizes the two channels corresponding to the user terminal devices of each pair, and calculates the spectrum efficiency obtained when the hierarchical MCS, in which a bit in any levels in the hierarchy is allocated to each user terminal device depending on the SNR of each user terminal device, is applied. That is, the hierarchical MCS efficiency calculating unit 103 calculates the spectrum efficiency obtained when a bit in the optimal level in the hierarchy is allocated depending on the SNR of each user terminal device. Then, the hierarchical MCS efficiency calculating unit 103 calculates a throughput obtained when the hierarchical MCS is applied to each pair, based on the calculated spectrum efficiency. An exemplary relationship between the SNR and the spectrum efficiency when the hierarchical MCS is applied is illustrated in FIG. 5. In the following, bits in each level in the hierarchy obtained by hierarchizing the two channels corresponding to the user terminal devices of each pair will be referred to as a hierarchical modulation channel.

The selecting unit 104 compares the throughput obtained by application of the normal MCS and the throughput obtained by application of the hierarchical MCS, and selects the MCS of which throughput is greater. That is, the selecting unit 104 selects the normal MCS when the throughput calculated by the normal MCS efficiency calculating unit 102 is greater, and selects a code rate and a modulation scheme corresponding to the SNR of each of the user terminal devices of each pair. Furthermore, the selecting unit 104 selects the hierarchical MCS when the throughput calculated by the hierarchical MCS efficiency calculating unit 103 is greater, and allocates to each user terminal device of each pair the hierarchical modulation channel corresponding to the SNR of each user terminal device.

Figure 6:
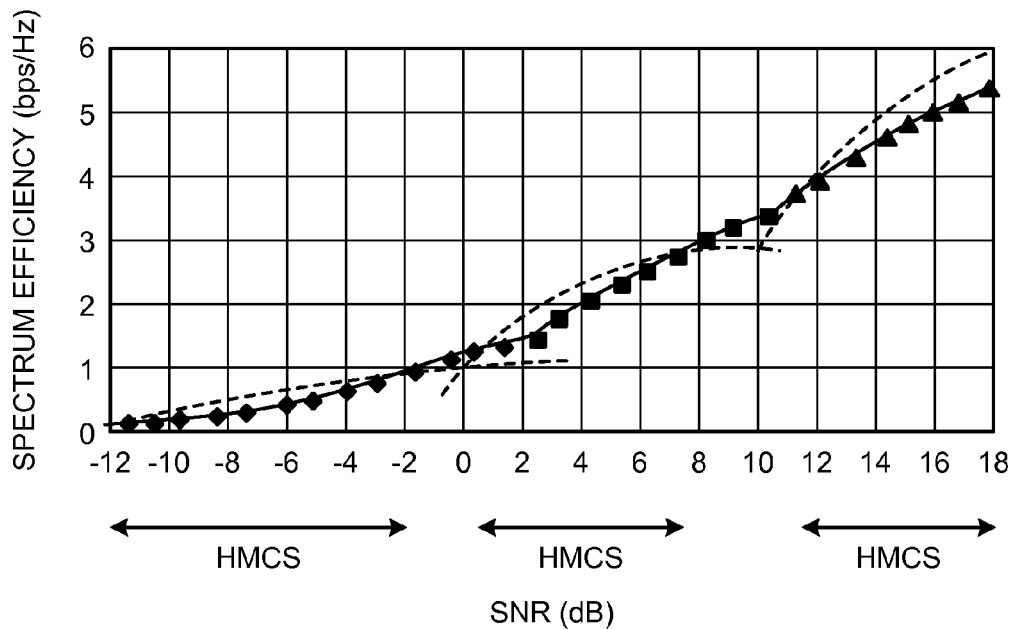
FIG. 6 is a diagram illustrating a detailed example of comparison of the spectrum efficiency.

Therefore, as illustrated in FIG. 6 for example, when the SNR of each user terminal device of each pair is in a range indicated by "HMCS (Hierarchical MCS)", the selecting unit 104 allocates the hierarchical modulation channel to each user terminal device because the spectrum efficiency calculated by the hierarchical MCS efficiency calculating unit 103 is greater and the throughput can be increased by applying the hierarchical MCS.

A simple example of allocation of the hierarchical modulation channel will be described below. As described above, because the reception quality of the UE #0 is bad and the reception quality of the UE #1 is good, when the UE #0 and the UE #1 are determined as a pair, a hierarchical modulation channel in a high level in the hierarchy is allocated to the UE #0 and a hierarchical modulation channel in a low level in the hierarchy is allocated to the UE #1. That is, when bits modulated by 16QAM are to be mapped to two channels corresponding to the UE #0 and the UE #1, it is assumed that upper 2 bits of the both channels are used as the hierarchical modulation channel for the UE #0 and lower 2 bits of the both channels are used as the hierarchical modulation channel for the UE #1.

That is, the hierarchical modulation channel in the high level in the hierarchy is formed of a bit group containing an MSB (Most Significant Bit) for which an error is less likely to occur from among the bits contained in the two channels corresponding to the user terminal devices as a pair, and the hierarchical modulation channel in the low level in the hierarchy is formed of a bit group containing an LSB (Least Significant Bit) for which an error is more likely to occur from among the bits contained in the two channels. The number of bits corresponding to each hierarchical modulation channel need not be identical, and it is possible to increase the number of bits corresponding to the hierarchical modulation channel in the high level of the hierarchy compared to the number of bits corresponding to the hierarchical modulation channel in the low level of the hierarchy.

The good UE coding unit 105 performs error correction coding on user data addressed to the user terminal of which SNR is high and of which reception quality is good in the pair. At this time, the good UE coding unit 105 performs the error correction coding on the user data at the code rate selected by the selecting unit 104 or the code rate dependent on the allocated hierarchical modulation channel.

The bad UE coding unit 106 performs error correction coding on user data addressed to the user terminal of which SNR is low and of which reception quality is bad in the pair. At this time, the bad UE coding unit 106 performs the error correction coding on the user data at the code rate selected by the selecting unit 104 or the code rate dependent on the allocated hierarchical modulation channel.

The hierarchical modulating unit 107 modulates the user data subjected to the error correction coding by the good UE coding unit 105 and the bad UE coding unit 106, and maps the user data to the two channels corresponding to the user terminal devices as the pair. More specifically, when the normal MCS is applied and the selecting unit 104 has selected the MCS for each user terminal device, the hierarchical modulating unit 107 modulates the user data by the modulation scheme corresponding to the MCS for each user terminal device, and maps the user data to the channel corresponding to each user terminal device. Furthermore, when the hierarchical MCS is applied and the selecting unit 104 has allocated the hierarchical modulation channel to each user terminal device, the hierarchical modulating unit 107 maps the user data for each user terminal device to the hierarchical modulation channel corresponding to each user terminal device.

Therefore, when the hierarchical modulation channel is allocated to each user terminal device, each user data is mapped to the hierarchical modulation channel corresponding to each user terminal device regardless of the two channels corresponding to the user terminal devices as the pair. For example, regarding the pair of the UE #0 and the UE #1, when user data #0 addressed to the UE #0 is "1111" and user data #1 addressed to the UE #1 is "0110", the user data #0 is allocated to the upper 2 bits (hierarchical modulation channel) of channels #0 and #1, and the user data #1 is allocated to the lower 2 bits (hierarchical modulation channel) of the channels #0 and #1.

Figure 7:
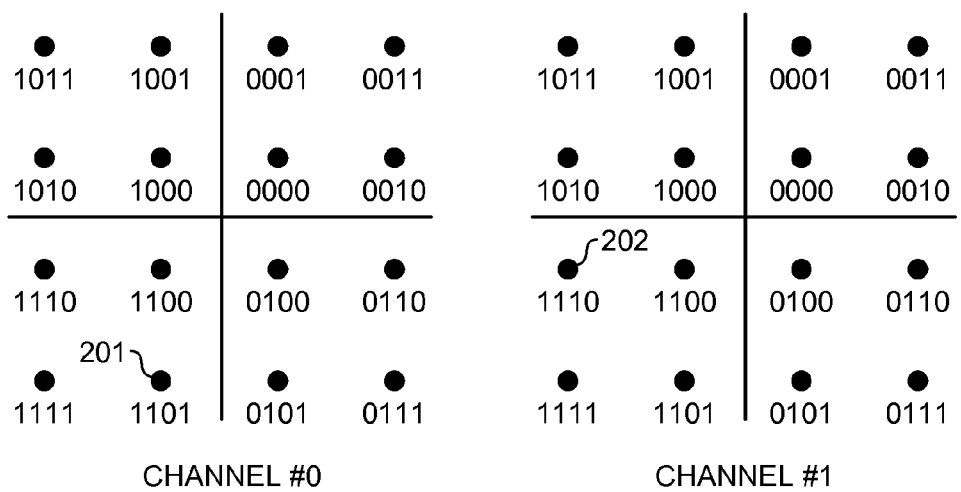
FIG. 7 is a diagram illustrating a detailed example of transmission symbols according to the embodiment.

Consequently, as illustrated in FIG. 7, the user data #0 and #1 are transmitted as a transmission symbol 201 in the channel #0, and transmitted as a transmission symbol 202 in the channel #1. That is, the upper 2 bits of the transmission symbols 201 and 202 contain the user data #0 "1111" and the lower 2 bits of the transmission symbols 201 and 202 contain the user data #1 "0110". Because the hierarchical modulation channel formed of the upper 2 bits of the transmission symbols 201 and 202 contains the MSB, an error is less likely to occur. Therefore, by allocating this hierarchical modulation channel to the UE #0 of which reception quality is bad, it is possible to improve the transmission efficiency of the user data #0 addressed to the UE #0. Furthermore, the hierarchical modulation channel formed of the lower 2 bits of the transmission symbols 201 and 202 contains the LSB and thus an error is more likely to occur. However, by allocating this hierarchical modulation channel to the UE #1 of which reception quality is good, the transmission efficiency of the user data #1 addressed to the UE #1 can hardly be reduced.

The wireless transmitting unit 108 performs predetermined wireless transmission processing, such as transmission power control, on the transmission symbol obtained by the modulation performed by the hierarchical modulating unit 107. At this time, the wireless transmitting unit 108 may perform the transmission power control by distinguishing the hierarchical modulation channels. That is, the wireless transmitting unit 108 may perform the transmission power control to increase the transmission power of the hierarchical modulation channel in a high level in the hierarchy compared to the transmission power of the hierarchical modulation channel in a low level in the hierarchy.

The wireless transmitting unit 108 also transmits a control channel signal for notifying the user terminal device of the MCS selected by the selecting unit 104 or the allocated hierarchical modulation channel via an antenna. That is, when the throughput calculated by the normal MCS efficiency calculating unit 102 is greater and the normal MCS is applied, the modulation scheme and the code rate are notified to the user terminal device by the control channel signal. Furthermore, when the throughput calculated by the hierarchical MCS efficiency calculating unit 103 is greater and the hierarchical MCS is applied, the hierarchical modulation channel allocated to each user terminal device is notified to the user terminal device.

The SNR receiving unit 109 receives SNR information on each user terminal device as CQI (Channel Quality Indicator) from the N user terminal devices performing the wireless communication. That is, each of the N user terminal devices measures the SNR of a signal transmitted from the base station device 100 and transmits the measurement result as the CQI, and the SNR receiving unit 109 receives the SNR information transmitted from each user terminal device via an antenna.

Figure 8:
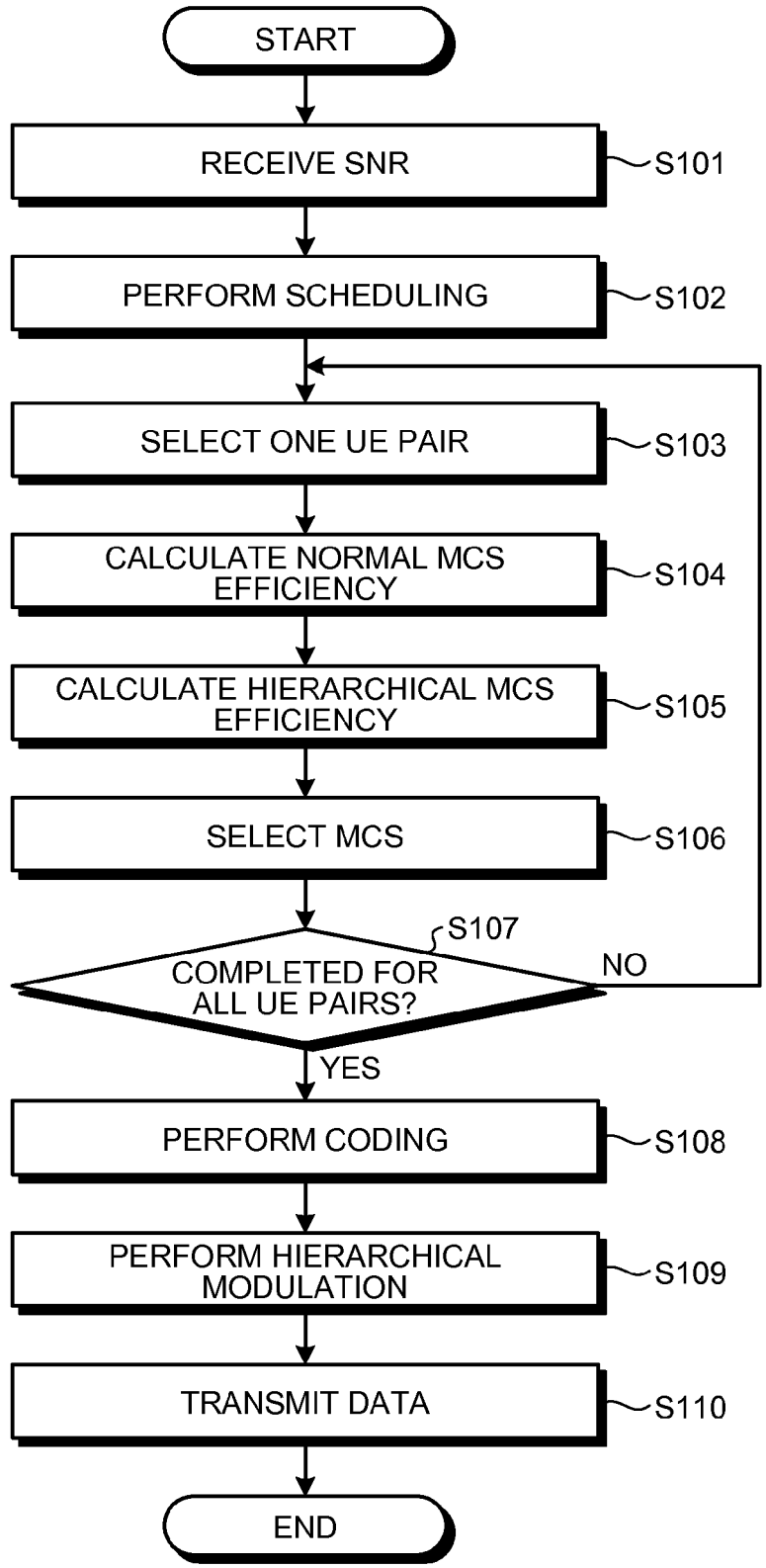
FIG. 8 is a flow diagram illustrating an operation of the base station device according to the embodiment.

Next, an operation performed by the base station device 100 having the above configuration at the time of data transmission will be described below with reference to a flow diagram of FIG. 8.

Each of the N user terminal devices performing the wireless communication with the base station device 100 transmits, as the CQI, the SNR information indicating the quality of reception from the base station device 100. The transmitted SNR information is received by the SNR receiving unit 109 of the base station device 100 (Step S101). Then, the SNRs of the N user terminal devices are notified to the pair determining unit 101, and the pair determining unit 101 performs scheduling for determining the order of transmission of user data #0 to #N−1 for the N user terminal devices (Step S102).

More specifically, the pair determining unit 101 combines two user terminal devices of which SNRs differ from each other to determine pairs. That is, the user data #0 of which reception quality is bad and the user data #1 of which reception quality is good are determined as a pair for example. By determining the pairs in this manner, it is possible to allocate the hierarchical modulation channel in a high level in the hierarchy to the user terminal device of which reception quality is bad and allocate the hierarchical modulation channel in a low level in the hierarchy to the user terminal device of which reception quality is good in each pair. As a result, the throughput of the system as a whole can be improved.

Then, the pair determining unit 101 determines the order of transmission to transmit the user data of each pair, and the pairs of the user terminal devices are selected one by one in the determined order of transmission (Step S103). When one pair of the user terminal devices is selected, the user data of the selected pair is output to the normal MCS efficiency calculating unit 102 and the hierarchical MCS efficiency calculating unit 103 together with the SNR information of each user terminal device.

Then, the normal MCS efficiency calculating unit 102 calculates a throughput obtained when the normal MCS is applied to the user terminal devices as the pair (Step S104). That is, the spectrum efficiency is calculated assuming that the modulation scheme and the code rate optimal to the SNR of each of the user terminal devices as the pair are selected, and a throughput is calculated based on the spectrum efficiency of each user terminal device.

Similarly, the hierarchical MCS efficiency calculating unit 103 calculates a throughput obtained when the hierarchical MCS is applied to the user terminal devices as the pair (Step S105). That is, the spectrum efficiency is calculated assuming that the hierarchical modulation channel optimal to the SNR of each of the user terminal devices as the pair is allocated, and a throughput is calculated based on the spectrum efficiency of each user terminal device.

After completion of the calculation of the throughputs obtained when the normal MCS and the hierarchical MCS are applied, the selecting unit 104 compares the two throughputs and selects the MCS of which throughput is greater (Step S106). That is, when the throughput obtained by application of the normal MCS is greater, it is determined to apply the normal MCS, and, when the throughput obtained by application of the hierarchical MCS is greater, it is determined to apply the hierarchical MCS.

Furthermore, when the normal MCS is applied, the selecting unit 104 determines the modulation scheme and the code rate corresponding to the SNR of each user terminal device. On the other hand, when the hierarchical MCS is applied, the selecting unit 104 determines allocation of the hierarchical modulation channel corresponding to the SNR of each user terminal device. Specifically, the bits of the two channels corresponding to the respective user terminal devices as the pair are divided into the hierarchical modulation channel in the high level of the hierarchy and the hierarchical modulation channel in the low level of the hierarchy, and the hierarchical modulation channel in the high level is allocated to the user terminal device of which SNR is low while the hierarchical modulation channel in the low level is allocated to the user terminal device of which SNR is high.

More specifically, the allocation of the hierarchical modulation channel is determined from among the pairs illustrated in FIG. 9 for example. That is, regarding the pair of the UE #0 of which reception quality is bad and the UE #1 of which reception quality is good, the topmost table contains pairs of the hierarchical modulation channels with use of QPSK as the modulation schemes for the channels #0 and #1 corresponding to the respective user terminal devices. In this table, for the pair identified by the number "1" for example, a hierarchical modulation channel formed of an I-component $I_0$ and a Q-component $Q_o$ of the channel #0 is allocated to the UE #0, and a hierarchical modulation channel formed of an I-component $I_1$ and a Q-component $Q_1$ of the channel #1 is allocated to the UE #1.

Furthermore, the second top table contains pairs of the hierarchical modulation channels with use of 16QAM as the modulation schemes for the channels #0 and #1. In this table, it is indicated that, for the pair identified by the number "2" for example, the hierarchical modulation channel formed of the upper 2 bits (MSB0) of the channel #0 and the upper 2 bits (MSB1) of the channel #1 is allocated to the UE #0, and the hierarchical modulation channel formed of the lower 2 bits (LSB0) of the channel #0 and the lower 2 bits (LSB1) of the channel #1 is allocated to the UE #1.

Moreover, the second lowest table contains pairs of the hierarchical modulation channels with use of 64QAM as the modulation schemes for the channels #0 and #1. In this table, it is indicated that, for a pair identified by the number "3" for example, the hierarchical modulation channel formed of the upper and middle 4 bits (MSB0+SB0) of the channel #0 and the upper 2 bits (MSB1) of the channel #1 is allocated to the UE #0, and the hierarchical modulation channel formed of the lower 2 bits (LSB0) of the channel #0 and the middle and lower 4 bits (SB1+LSB1) of the channel #1 is allocated to the UE #1.

Furthermore, the modulation schemes for the channels #0 and #1 are not necessarily identical. For example, the lowest table contains pairs of the hierarchical modulation channels with use of 16QAM and 64QAM as the respective modulation schemes for the channels #0 and #1. In this table, it is indicated that, for a pair identified by the number "2" for example, the hierarchical modulation channel formed of 4 bits (MSB0+LSB0) of the channel #0 and the upper 2 bits (MSB1) of the channel #1 is allocated to the UE #0, and the hierarchical modulation channel formed of the middle and lower 4 bits (SB1+LSB1) of the channel #1 is allocated to the UE #1.

In this manner, when the hierarchical MCS is applied, the hierarchical modulation channel is allocated to each user terminal device, so that the MCS is selected for the user terminal devices of each pair. Then, before or after the selecting unit 104 selects the MCS for the two channels corresponding to the user terminal devices as the pair, it is determined whether the pair determining unit 101 completes selection of the MCS for all of the pairs (Step S107). As a result of determination, when the MCS is not selected for all of the pairs (NO at Step S107), the pair determining unit 101 sequentially selects a pair of which order of transmission determined at the scheduling is the earliest from the remaining pairs, and repeats the selection of the MCS as described above.

On the other hand, when the selection of the MCS is completed for all of the pairs (YES at Step S107), the user data addressed to the user terminal device of which SNR is high and of which reception quality is good in each pair is output to the good UE coding unit 105, and the user data addressed to the user terminal device of which SNR is low and of which reception quality is bad is output to the bad UE coding unit 106. The user data addressed to the user terminal devices of each pair is subjected to error correction coding by the good UE coding unit 105 or the bad UE coding unit 106 (Step S108). That is, for the user terminal devices of a pair to which the normal MCS is applied, the error correction coding is performed on each user data at the code rate selected by the selecting unit 104. On the other hand, for the user terminal devices of a pair to which the hierarchical MCS is applied, the error correction coding is performed on each user data at the code rate corresponding to the hierarchical modulation channel that the selecting unit 104 has allocated to each user terminal device.

The user data subjected to the error correction coding is modulated by the hierarchical modulating unit 107 and mapped to the two channels corresponding to the user terminal devices of each pair (Step S109). At this time, for the user terminal devices of a pair to which the normal MCS is applied, each user data is modulated by the modulation scheme selected by the selecting unit 104, and is independently mapped to the channel of each user terminal device. On the other hand, for the user terminal devices of a pair to which the hierarchical MCS is applied, each user data is mapped to the hierarchical modulation channel that the selecting unit 104 has allocated to each user terminal device.

Specifically, regarding the pair of the UE #0 and the UE #1 for example, the top part of FIG. 10 illustrates a channel structure when the two channels (the channels #0 and #1) corresponding to the pair are modulated by 16QAM, and the pair of the hierarchical modulation channels identified by the number "2" in the second top table in FIG. 9 is selected. In this pair, the upper 2 bits (MSB0) of the channel #0 and the upper 2 bits (MSB1) of the channel #1 form the hierarchical modulation channel for the UE #0, and the lower 2 bits (LSB0) of the channel #0 and the lower 2 bits (LSB1) of the channel #1 form the hierarchical modulation channel for the UE #1.

Similarly, the middle part of FIG. 10 illustrates a channel structure when the two channels corresponding to the pair of the UE #0 and the UE #1 are modulated by 64QAM, and the pair of the hierarchical modulation channels identified by the number "3" in the second lowest table of FIG. 9 is selected. In this pair, the upper and middle 4 bits (MSB0+SB0) of the channel #0 and the upper 2 bits (MSB1) of the channel #1 form the hierarchical modulation channel for the UE #0, and the lower 2 bits (LSB0) of the channel #0 and the middle and lower 4 bits (SB1+LSB1) of the channel #1 form the hierarchical modulation channel for the UE #1.

Furthermore, the bottom part of FIG. 10 illustrates a channel structure when the two channels corresponding to the pair of the UE #0 and the UE #1 are modulated by 16QAM and 64QAM, respectively, and the pair of the hierarchical modulation channels identified by the number "2" in the lowest table of FIG. 9 is selected. In this pair, 4 bits (MSB0+LSB0) of the channel #0 and the upper 2 bits (MSB1) of the channel #1 form the hierarchical modulation channel for the UE #0, and the middle and lower 4 bits (SB1+LSB1) of the channel #1 form the hierarchical modulation channel for the UE #1.

In this manner, when the hierarchical MCS is applied, the channels #0 and #1 are not directly corresponding to the UE #0 and the UE #1, respectively. Respective transmission symbols of the channels #0 and #1 are generated by the hierarchical modulating unit 107 such that the bits in the high level of the hierarchy for which an error is less likely to occur are used as the hierarchical modulation channel for the UE #0, and bits in the low level of the hierarchy for which an error is more likely to occur are used as the hierarchical modulation channel for the UE #1.

The user data modulated by the hierarchical modulating unit 107 is subjected to predetermined wireless transmission processing, such as transmission power control, by the wireless transmitting unit 108, and transmitted via an antenna (Step S110). In the transmission power control by the wireless transmitting unit 108, control is performed to increase the transmission power of the hierarchical modulation channel for the UE #0 compared to the transmission power of the hierarchical modulation channel for the UE #1. This is equivalent to the case where four signal points in each quadrant in the constellation of 16QAM for example are brought closer to each other so that all of the signal points are brought away from the I axis and the Q axis to reduce the chance of an error on the upper 2 bits (MSB) without changing the transmission power as a whole. Therefore, by performing the transmission power control on each hierarchical modulation channel, it is possible to reduce the chance of an error on the user data #0 for the UE #0 of which reception quality is bad.

Figure 11:
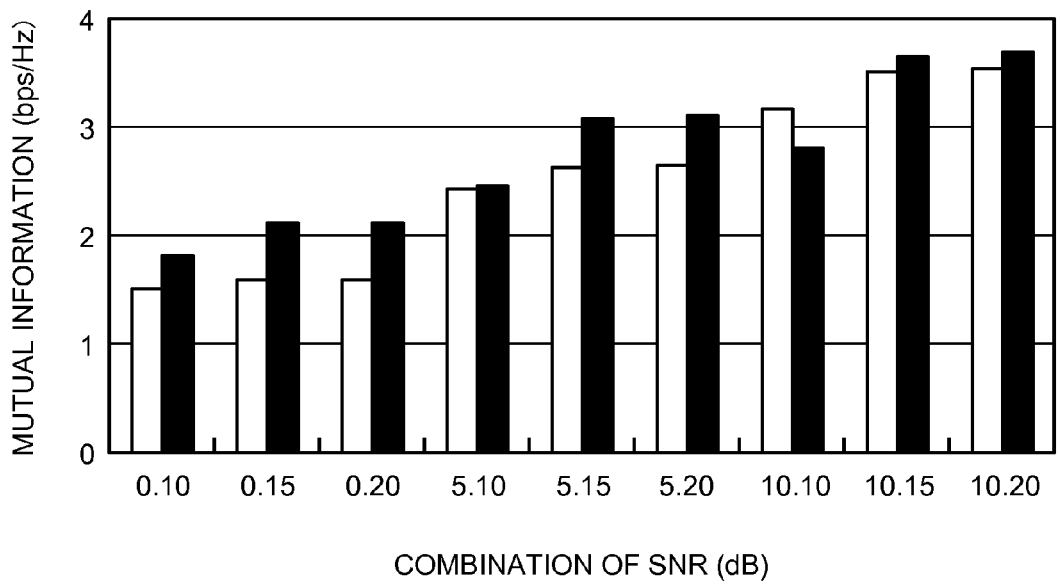
FIG. 11 is a diagram illustrating a relationship between SNR and mutual information according to the embodiment.

In this manner, according to the embodiment, when the hierarchical MCS is applied, a hierarchical modulation channel of high quality is allocated to one of the user terminal devices as a pair. Therefore, it is possible to improve transmission efficiency especially when there is a difference in the reception quality between two user terminal devices as a pair. FIG. 11 is a diagram illustrating a relationship between SNR and mutual information according to the embodiment. FIG. 11 is a diagram illustrating a relationship between a combination of SNRs of user terminal devices as a pair and mutual information. In this figure, white bars represent the mutual information obtained when the normal MCS is applied, and black bars represent the mutual information obtained when the hierarchical MCS is applied. Referring to the graph of FIG. 11, the mutual information obtained by applying the hierarchical MCS becomes greater in almost all of the cases except for a case where the SNRs of the two user terminal devices are identical at 10 (dB). Furthermore, the mutual information obtained by applying the hierarchical MCS tends to increase as the difference in the SNR between the user terminal devices increases. Therefore, the hierarchical MCS is more advantageous than the normal MCS when a difference in the reception quality between the user terminal devices as a pair increases.

Meanwhile, the wireless transmitting unit 108 of the base station device 100 transmits a control channel signal by using a control channel in addition to the transmission of the user data as described above. The control channel signal is a signal for notifying a pair of the user terminal devices or the MCS allocated to each user terminal device. That is, the control channel signal contains information on whether the normal MCS is applied or the hierarchical MCS is applied. When the normal MCS is applied, the code rate and the modulation scheme allocated to each user terminal device are notified to the user terminal devices by the control channel signal. On the other hand, when the hierarchical MCS is applied, the user terminal devices as a pair or the hierarchical modulation channel allocated to each user terminal device are/is notified to the user terminal device by the control channel signal.

The user terminal device receives the control channel signal transmitted from the base station device 100. When the normal MCS is applied, the user terminal device receives only a signal of a channel corresponding to own user. On the other hand, when the hierarchical MCS is applied, the user terminal device receives signals of channels corresponding to the user terminal devices as a pair. The user terminal device acquires user data addressed to the own user from the hierarchical modulation channel allocated to the own user.

Figure 12:
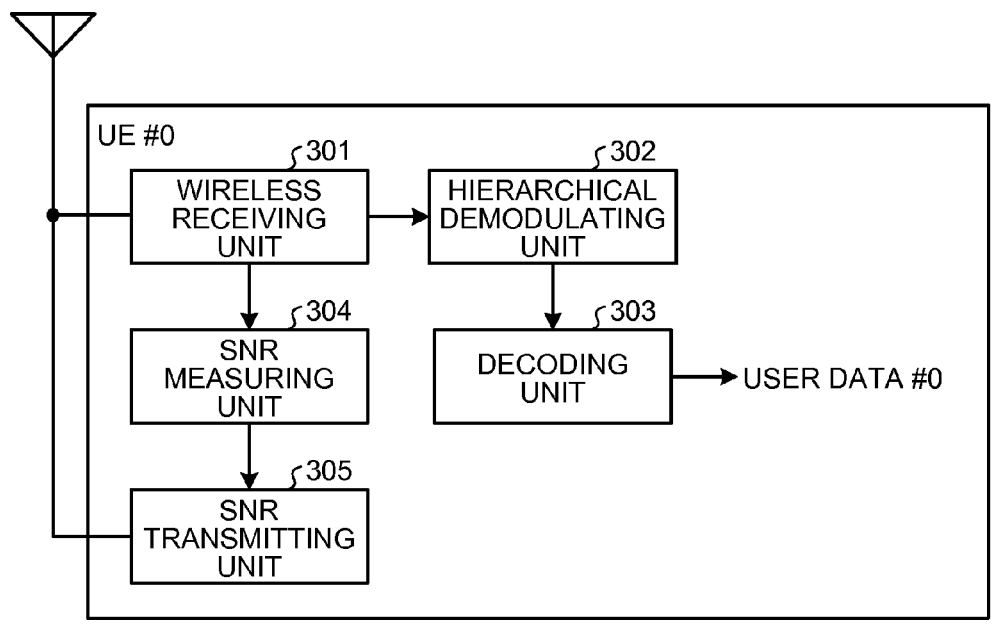
FIG. 12 is a block diagram illustrating configuration of main components of a user terminal device according to the embodiment.

The configurations of main components of the UE #0 as one of the user terminal devices will be described below with reference to FIG. 12. As illustrated in FIG. 12, the UE #0 includes a wireless receiving unit 301, a hierarchical demodulating unit 302, a decoding unit 303, an SNR measuring unit 304, and an SNR transmitting unit 305. In the following, operations performed by each processing unit when the hierarchical MCS is applied are mainly described and explanation of operations performed when the normal MCS is applied will be omitted.

The wireless receiving unit 301 receives the control channel signal and the user data transmitted from the base station device 100 via an antenna, and performs predetermined wireless reception processing on the received signal. At this time, when notified by the control channel signal that the hierarchical MCS is applied, the wireless receiving unit 301 receives not only a signal of the channel corresponding to the own user (the UE #0) but also a signal of the channel corresponding to the other user (the UE #1) being paired with the own user.

The hierarchical demodulating unit 302 demodulates the reception signal received by the wireless receiving unit 301. Specifically, the hierarchical demodulating unit 302 acquires data of the hierarchical modulation channel allocated to the own user (the UE #0) from the signals of the 2 channels respectively corresponding to the UE #0 and the UE #1. At this time, because the hierarchical modulation channel allocated to the UE #0 corresponds to bits for which an error is less likely to occur, the hierarchical demodulating unit 302 can acquire the data of the UE #0 with high accuracy.

The decoding unit 303 performs error correction decoding on the data acquired by the hierarchical demodulating unit 302, and outputs the user data #0 addressed to the UE #0. As described above, because the hierarchical modulation channel of high quality is allocated to the UE #0, the user data #0 can be obtained with accuracy even when the reception quality of the UE #0 is bad.

The SNR measuring unit 304 measures the SNR of the reception signal received by the wireless receiving unit 301. The SNR transmitting unit 305 transmits the measurement result obtained by the SNR measuring unit 304 as the CQI to the base station device 100. The SNR information contained in the CQI is used by the base station device 100 for determining a pair of the user terminal devices or selecting the MCS.

As described above, according to the embodiment, a pair of the user terminal devices of which reception quality differs from each other is determined, a throughput obtained by application of the normal MCS and a throughput obtained by application of the hierarchical MCS are compared with each other for each pair, and the MCS of which throughput is greater is applied. When the hierarchical MCS is applied, the 2 channels corresponding to the user terminal devices as a pair are collectively hierarchized such that the hierarchical modulation channel of high quality is allocated to the user terminal device of which reception quality is bad and the hierarchical modulation channel of low quality is allocated to the user terminal device of which reception quality is good. Consequently, it is possible to allocate a bit of high quality or increased number of bits to the user terminal device of which reception quality is bad without constraints of the channel for each user terminal device. Therefore, it is possible to improve the data transmission efficiency for each user terminal device when there is a difference in the reception quality among a plurality of user terminal devices.

In the embodiment described above, two user terminal devices are paired, and two channels corresponding to the user terminal devices of each pair are hierarchized. However, it is possible to combine three or more user terminal devices and hierarchizes three or more channels corresponding to the user terminal devices of each combination. That is, it is sufficient if a plurality of user terminal devices is combined, all of channels corresponding to the user terminal devices in the combination are hierarchized, and a hierarchical modulation channel in a higher level of the hierarchy is allocated to a user terminal device of which reception quality is lower.

Figure 13:
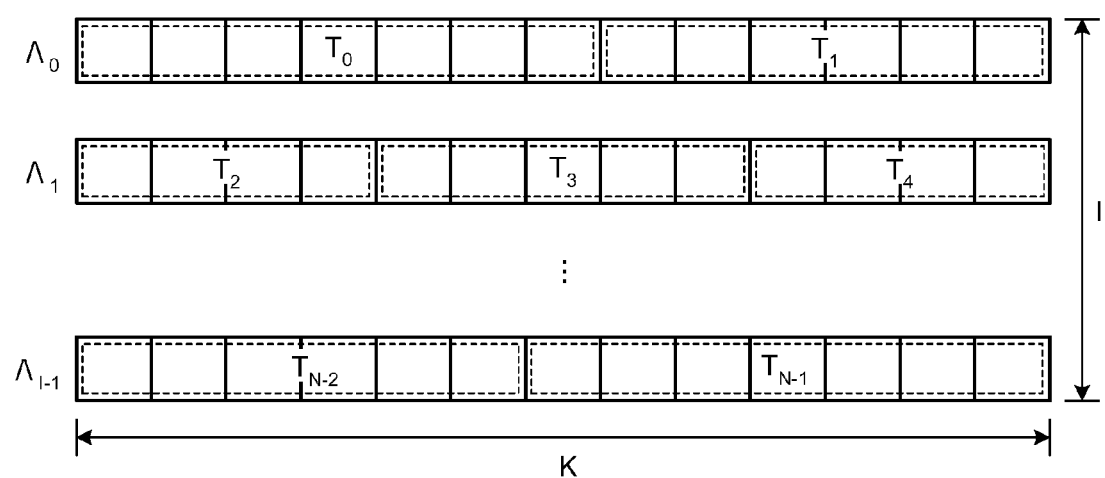
FIG. 13 is a diagram schematically illustrating an example of a channel structure.

That is, for generalization, as illustrated in FIG. 13, I hierarchical modulation channels $\Lambda_0$ to $\Lambda_{I-1}$ are allocated to packets $T_0$ to $T_{N-1}$ of N user terminal devices, respectively. At this time, assuming that the quality of the hierarchical modulation channel $\Lambda_i$ is higher than the quality of the hierarchical modulation channel a $\Lambda_{i+1}$, a packet of a user terminal device of which reception quality is worse is allocated to a higher hierarchical modulation channel in FIG. 13. Then, a part of the combined packets of the I user terminal devices is mapped to each of K channels. In each of the K channels, a part of the packets addressed to the user terminal device of which reception quality is the worst among the combined I user terminal devices is mapped to the hierarchical modulation channel $\Lambda_0$, and a part of the packets addressed to the user terminal device of which reception quality is the best among the combined I user terminal devices is mapped to the hierarchical modulation channel $\Lambda_{I-1}$.

Furthermore, according to the embodiment described above, the throughput obtained by application of the normal MCS and the throughput obtained by application of the hierarchical MCS are compared with each other, and the MCS of which throughput is greater is applied. However, it is possible to fixedly apply the hierarchical MCS.

Moreover, according to the embodiment described above, SNR is used as the reception quality of the user terminal device. However, the reception quality may be SIR (Signal to Interference Ratio) or the reception electric field intensity, and any of the above reception quality may be used.

According to a base station device and a data mapping method according to one aspect of the invention, it is possible to improve data transmission efficiency to each user terminal device when there is a difference in the reception quality among a plurality of user terminal devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A base station device comprising:
a determining unit that determines a combination of a plurality of users having different reception qualities;
a first calculating unit that calculates a throughput obtained when a modulation scheme dependent on a reception quality is allocated to each user;
a second calculating unit that calculates a throughput obtained when a hierarchical modulation channel dependent on a reception quality is allocated to each user,
an allocating unit that generates, when the throughput calculated by the second calculating unit is equal to or greater than the throughput calculated by the first calculating unit, a plurality of hierarchical modulation channels having different qualities based on channel elements constituting channels corresponding to the respective users in the combination determined by the determining unit, and allocates the hierarchical modulation channels to the respective users such that a hierarchical modulation channel having a higher quality is allocated to a user having a lower reception quality;
a mapping unit that maps data for each user to the hierarchical modulation channel allocated to each user by the allocating unit; and
a transmitting unit that transmits the data mapped by the mapping unit.

2. The base station device according to claim 1, wherein the allocating unit generates a high-quality hierarchical modulation channel containing upper bits of each of the channels corresponding to the respective users in the combination and a low-quality hierarchical modulation channel containing lower bits of each of the channels, allocates the high-quality hierarchical modulation channel to a user having the lowest reception quality among the users in the combination, and allocates the low-quality hierarchical modulation channel to a user having the highest reception quality among the users in the combination.

3. The base station device according to claim 1, wherein the allocating unit increases number of bits contained in a hierarchical modulation channel of higher quality compared to number of bits contained in a hierarchical modulation channel of lower quality.

4. The base station device according to claim 1, wherein the transmitting unit includes a transmission power control unit for controlling data transmission power for each hierarchical modulation channel, and transmits data with higher data transmission power for a hierarchical modulation channel of higher quality.

5. The base station device according to claim 1, wherein the determining unit combines users of which reception qualities differ from each other by a predetermined threshold or more.

6. The base station device according to claim 1, wherein the transmitting unit includes a control channel transmitting unit for transmitting a control channel signal indicating a hierarchical modulation channel allocated to each user.

7. The base station device according to claim 1, wherein the mapping unit maps the data to a channel for each user by using the modulation scheme dependent on the reception quality of each user when the throughput calculated by the second calculating unit is smaller than the throughput calculated by the first calculating unit.

8. A user terminal device comprising:
a control channel receiving unit that receives a control channel signal indicating whether a modulation scheme dependent on a reception quality or a hierarchical modulation channel generated based on channel elements of channels corresponding to own user and another user is applied;
a receiving unit that receives signals of the channels corresponding to the own user and the other user when the control channel signal received by the control channel receiving unit indicates that the hierarchical modulation channel is applied; and
an extracting unit that extracts data addressed to the own user from the signals received by the receiving unit.

9. A data mapping method comprising:
determining a combination of a plurality of users having different reception qualities;
calculating a first throughput obtained when a modulation scheme dependent on a reception quality is allocated to each user;
calculating a second throughput obtained when a hierarchical modulation channel dependent on a reception quality is allocated to each user, generating, when the second throughput is equal to or greater than the first throughput, a plurality of hierarchical modulation channels having different qualities based on channel elements constituting channels corresponding to the respective users in the combination determined at the determining;

allocating the hierarchical modulation channels to the respective users such that a hierarchical modulation channel having a higher quality is allocated to a user having a lower reception quality; and mapping data for each user to the hierarchical modulation channel allocated to each user at the allocating.

10. The base station device according to claim 1, wherein the allocating unit generates the hierarchical modulation channels based on the channel elements constituting the channels modulated by different modulation schemes.

11. The user terminal device according to claim 8, wherein the control channel receiving unit receives the control channel signal indicating the hierarchical modulation channel is applied, the hierarchical modulation channel generated based on the channel elements of the channels modulated by different modulation schemes.

* * * * *